(12) United States Patent
Qi et al.

(10) Patent No.: US 8,226,915 B2
(45) Date of Patent: Jul. 24, 2012

(54) COATED PEROVSKITE-BASED CATALYSTS, CATALYST COMBINATIONS AND METHODS OF TREATING A GAS STREAM

(75) Inventors: Gongshin Qi, Troy, MI (US); Chang H Kim, Rochester, MI (US); Wei Li, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 60 days.

(21) Appl. No.: 12/955,317

(22) Filed: Nov. 29, 2010

(65) Prior Publication Data

US 2012/0134907 A1    May 31, 2012

(51) Int. Cl.
*B01D 53/56* (2006.01)
*B01D 53/94* (2006.01)
*F01N 3/10* (2006.01)

(52) U.S. Cl. ............. 423/213.2; 423/239.1; 60/299; 60/301

(58) Field of Classification Search ........... 423/213.2, 423/239.1; 60/299, 301
See application file for complete search history.

(56) References Cited

U.S. PATENT DOCUMENTS

| | | |
|---|---|---|
| 8,137,648 B2 * | 3/2012 | Jen et al. ............ 423/210 |
| 2010/0209326 A1 * | 8/2010 | Gandhi et al. ......... 423/239.1 |
| 2010/0229533 A1 * | 9/2010 | Li et al. ............. 60/274 |

* cited by examiner

*Primary Examiner* — Timothy Vanoy
(74) *Attorney, Agent, or Firm* — BrooksGroup

(57) ABSTRACT

One embodiment of the invention includes a method of treating a gas stream comprising flowing the gas stream over a hydrocarbon reduction and $NO_x$ reduction catalyst first, and thereafter flowing the gas over a perovskite and $NO_x$ trap material for $NO_x$ oxidation and storage. In one embodiment, the hydrocarbon reduction and $NO_x$ reduction catalyst may include palladium. In one embodiment, the perovskite catalyst may have the general formula $ABO_3$, $AA'BO_3$, $ABB'O_3$, or $AA'BB'O_3$. The perovskite catalyst may be the only catalyst or a second non-perovskite catalyst may include at least one of palladium, platinum, rhodium, ruthenium or a catalyst system including one or more of the same or alloys thereof. In one embodiment, the $NO_x$ trap material may include at least one of alkali metals, alkaline earth metals such as barium, calcium, potassium, or sodium.

26 Claims, 5 Drawing Sheets

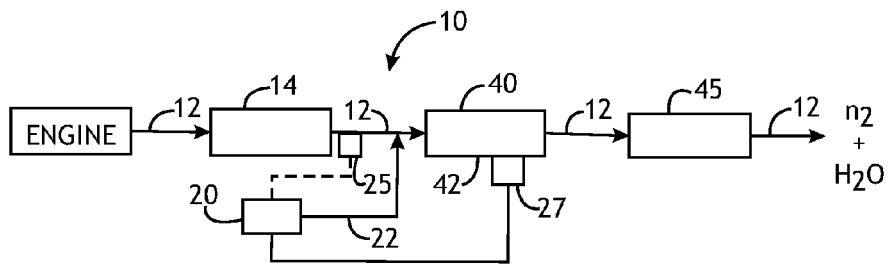
Fig.11
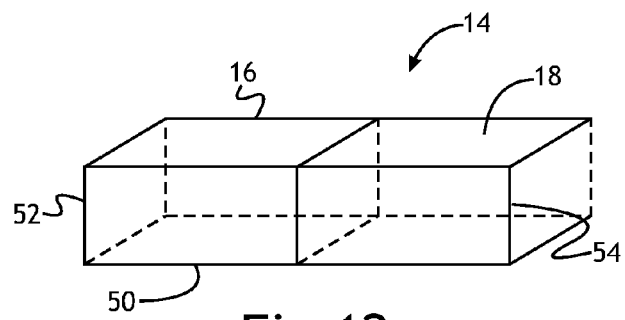
Fig.12
PERFORMANCE OF CATALYSTS
| La | Sr | Co | Mr | Conversion at 325°C % | S.A. (m²/g) |
|---|---|---|---|---|---|
| 1 | 0 | 1 | 0 | 79 | 10.6 |
| 1 | 0 | 1 | 0 | 78 | 66.4 |
| 0.9 | 0.1 | 1 | 0 | 86 | 20.4 |
| 0.8 | 0.2 | 1 | 0 | 84 | 34.7 |
| 0.7 | 0.3 | 1 | 0 | 79 | 12.4 |
| 1 | 0 | 0 | 1 | 70 | 7.4 |
| 1 | 0 | 0 | 1 | 62 | 11.3 |
| 0.9 | 0.1 | 0 | 1 | 64 | 14.5 |
| COMMERCIAL PLATINUM CATALYSTS | | | | 45 | - |
Fig.13

COATED PEROVSKITE-BASED CATALYSTS, CATALYST COMBINATIONS AND METHODS OF TREATING A GAS STREAM

TECHNICAL FIELD

The field to which the disclosure generally relates to includes coated perovskite-based catalysts, catalyst combinations, and methods and systems for treating a gas stream.

BACKGROUND

A catalyst can be used to catalyze a reaction of components in a gas stream.

SUMMARY OF ILLUSTRATIVE EMBODIMENTS OF THE INVENTION

One embodiment of the invention includes a method of treating a gas stream comprising flowing a gas stream over a hydrocarbon reduction and $NO_x$ reduction catalyst first and thereafter flowing the exhaust gas over a perovskite and $NO_x$ trap material for $NO_x$ oxidation and storage. In one embodiment, the hydrocarbon reduction and $NO_x$ reduction catalyst may include palladium. In one embodiment, the perovskite catalyst may have the general formula $ABO_3$, $AA'BO_3$, $ABB'O_3$, or $AA'BB'O_3$. The perovskite catalyst may be the only catalyst or a second non-perovskite catalyst may include at least one of palladium, platinum, rhodium, ruthenium or a catalyst system including one or more of the same or alloys thereof. In one embodiment, the $NO_x$ trap material may include at least one of alkali metals, alkaline earth metals (such as barium, calcium, potassium, or sodium). The gas stream to be treated may include $NO_x$ from any of a variety of sources that include or produce such a gas stream including, but not limited to, chemical processing plants and equipment, medical devices and combustion engine running at any of a variety of air/fuel ratios.

One embodiment of the invention may include a product comprising a catalyst combination comprising a perovskite catalyst and a second catalyst that is not a perovskite catalyst. In one embodiment, the perovskite catalyst may have the general formula $ABO_3$, $AA'BO_3$, $ABB'O_3$, or $AA'BB'O_3$. In another embodiment, the second non-perovskite catalyst may comprise at least one metal from the precious metal or noble metal group of the periodic table. In another embodiment, the second non-perovskite catalyst may comprise at least one of palladium, platinum, rhodium or ruthenium, or catalyst systems including the same. In one embodiment, a catalyst combination may include a perovskite catalyst and a second non-perovskite catalyst, where the second non-perovskite catalyst have a precious metal loading of about 1-160 g/ft³, 1-80 g/ft³, 1-60 g/ft³, 1-40 g/ft³, 1-20 g/ft³, or a loading within such ranges. In one embodiment of a catalyst combination comprising a second non-perovskite catalyst, the perovskite catalyst may have a loading ranging from 1 to 120 g/L, 1 to 80 g/L, 1 to 40 g/L, 1 to 20 g/L.

In one embodiment, a catalyst combination may include a perovskite catalyst and a second catalyst non-perovskite catalyst, wherein the second non-perovskite catalyst comprises platinum having a loading of about 1-160 g/ft³, 1-80 g/ft³, 1-20 g/ft³, or a loading within such ranges. In one embodiment of a catalyst combination comprising platinum, the perovskite catalyst may have a loading ranging from 1 to 120 g/L, 1 to 80 g/L, 1 to 40 g/L, 1 to 20 g/L.

In one embodiment, a catalyst combination may include a perovskite catalyst and a second catalyst non-perovskite catalyst, wherein the second non-perovskite catalyst comprises palladium have a loading of about 5-100 g/ft³, or 10-60 g/ft³, or a loading within such ranges. In one embodiment of a catalyst combination comprising palladium, the perovskite catalyst may have a loading ranging from 1 to 120 g/L, 1 to 80 g/L, 1 to 40 g/L, 1 to 20 g/L.

One embodiment may include treatment of a gas stream that includes $NO_x$ with a perovskite catalyst having the general formula $ABO_3$, $AA'_BO_3$, $ABB'O_3$, or $AA'BB'O_3$, in a catalytic oxidation reaction to oxidize nitric oxide in the gas stream.

In one embodiment, the perovskite catalyst of the general formula $ABO_3$ used in the oxidation reaction may be supported on any of a variety of substrates including, but not limed to, at least one of reactor packing structures and materials, beads, pellets, fluidized bed powders or other solid particulate material suspendable in a flow of gas, a flow-through monolith, a wall-flow monolith, a metal monolith, a ceramic monolith, metal or ceramic fabricated supports.

In one embodiment, the perovskite catalyst of the general formula $ABO_3$ used in the oxidation reaction may be not be supported by a substrate but may be formed into substrates having any of a variety of configurations including, but not limited to, flat panels, beads, pellets, or reactor packing material shapes.

Another embodiment may include a perovskite catalyst of the general formula $ABO_3$ in a catalytic oxidation reactor for oxidizing nitric oxide in an exhaust stream of a lean burning hydrocarbon fueled power source, wherein A represents a rare earth metal from the Lanthanide Series and/or an alkaline-earth metal, and wherein B represents a transition metal.

In another embodiment, the catalytic performance of the perovskite catalyst of the general formula $ABO_3$ as described above may be enhanced by the substitution of a small amount of a promoter material for a portion of at least one of element A or element B in the catalytic formulation.

Another embodiment may include an exhaust system for reducing $NO_x$ emissions including a catalytic oxidation reactor having the perovskite catalyst of the general formula $ABO_3$ or a modified formula of $ABO_3$ wherein a small amount of a promoter material is substituted for a portion of at least one of element A or element B.

Another embodiment may include a method of using a perovskite catalyst to oxidize nitric oxide in a gas.

Other illustrative embodiments of the invention will become apparent from the detailed description provided hereinafter. It should be understood that the detailed description and specific examples, while disclosing illustrative embodiments of the invention, are intended for purposes of illustration only and are not intended to limit the scope of the invention.

BRIEF DESCRIPTION OF THE DRAWINGS

Illustrative embodiments of the invention will become more fully understood from the detailed description and the accompanying drawings, wherein:

FIG. 11 is a schematic flow diagram of an exhaust system for a hydrocarbon fueled power source having a perovskite catalyst for oxidizing nitric oxide to nitrogen dioxide in accordance with an exemplary embodiment.

FIG. 12 is a close-up view of the catalytic oxidation reactor of FIG. 11.

FIG. 13 is a table describing the performance of the perovskite catalysts according to the exemplary embodiment in oxidizing nitric oxide versus a conventional platinum catalyst.

DETAILED DESCRIPTION OF ILLUSTRATIVE EMBODIMENTS

The following description of the embodiment(s) is merely illustrative in nature and is in no way intended to limit the invention, its application, or uses.

One embodiment of the invention includes a method of treating a gas stream including $NO_x$ including flowing the exhaust stream over a first zone including a hydrocarbon reduction and $NO_x$ reduction catalyst first and thereafter flowing the exhaust stream over a perovskite and $NO_x$ trap material for $NO_x$ oxidation and storage. In one embodiment, the hydrocarbon reduction and $NO_x$ reduction catalyst may include at least one of palladium, platinum, gold, rhodium, iridium, silver or copper, combinations thereof or alloys thereof. In one embodiment, the $NO_x$ trap material may include alkali metals such as at least one of potassium, sodium, lithium or cesium, or alkaline earth metals including at least one of calcium, barium or strontium, or alloys or oxides thereof. Suitable porous support materials may includes, but are not limited to, zeolite, zirconia, alpha alumina, cerium oxide, or magnesium oxide.

In one embodiment, rare earth based oxides may be used as $NO_x$ trap materials including $CeO_2$—$ZrO_2$, $CeO_2$—$ZrO_2$—$Pr_6O_{11}$, $CeO_2$—$ZrO_2$—$Pd_2O_3$ or $CeO_2$—$ZrO_2$—$La_2O_3$.

Figure 1:
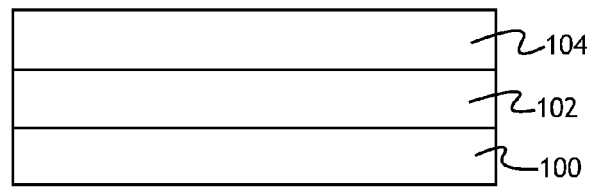
FIG. 1 illustrates a product that includes a substrate having a perovskite and $NO_x$ trap material on the substrate and a hydrocarbon reduction and $NO_x$ reduction catalyst over the perovskite catalyst and $NO_x$ trap material according to one embodiment of the invention.

FIG. 1 illustrates one embodiment of the invention which may include a product or system including a substrate 100 which may be solid or porous. A first layer or zone 102 including a perovskite and $NO_x$ trap material may be coated directly on the substrate or over the substrate and a second layer or zone 104 including a hydrocarbon and $NO_x$ reduction catalyst coated directly on the first layer or overlying the first layer. The first layer or zone 102 and the second layer or zone 104 are porous so that exhaust gas flowing over the same may flow through the first and second layers or zones.

Figure 2:
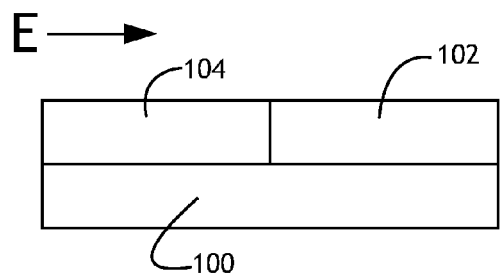
FIG. 2 is a sectional view of a substrate having a coating on a first portion thereof for hydrocarbon reduction and $NO_x$ reduction in a second portion downstream thereof including a perovskite catalyst according to one embodiment of the invention.

FIG. 2 illustrates an alternative embodiment including a substrate 100 having a first zone 104 including a hydrocarbon reduction and $NO_x$ reduction catalyst coated directly thereon or over the substrate in an upstream position of the direction of the exhaust stream to be treated (shown by arrow E), and a second layer or zone 102 downstream of the first layer or zone 104. The first layer or zone 102 may include a perovskite and $NO_x$ trap material coated directly on the substrate 100 or over the same.

Figure 3:
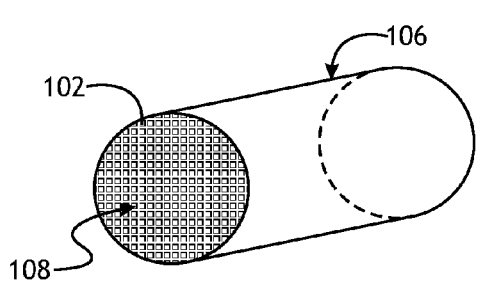
FIG. 3 illustrates a flow-through monolith having exhaust gas through holes formed therein and a coating thereon defining a first zone including a hydrocarbon reduction and $NO_x$ reduction catalyst and a second zone including a perovskite catalyst according to one embodiment of the invention.
Figure 4:
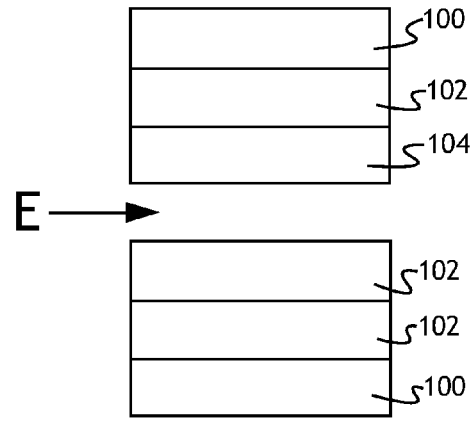
FIG. 4 illustrates a section of a flow-through monolith having a substrate, a perovskite and $NO_x$ trap material on the substrate and a hydrocarbon reduction and $NO_x$ reduction catalyst over the same according to one embodiment of the invention.

FIG. 3 illustrates a coated flow-through monolith 106 which may include a support material made from ceramic, metal or other suitable material having a plurality of through holes 108 formed therein for the flow of exhaust gas. The monolith 106 may include a first coating or zone 102 formed on the structural material substrate 100 of the monolith, and a second layer or zone 104 coated directly on or over the first layer 102 as shown in FIG. 4.

Figure 5:
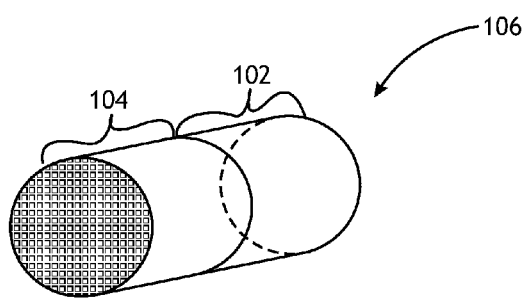
FIG. 5 illustrates a flow-through monolith having a first zone including a hydrocarbon reduction and $NO_x$ reduction catalyst coated on a substrate of the monolith and a second downstream zone having a perovskite and nitrogen trap material coated on a second portion of the monolith according to one embodiment of the invention.

In an alternative embodiment, the monolith 106 as shown in FIG. 5 may include a first zone 104 having the hydrocarbon reduction and $NO_x$ reduction catalyst coated thereon, and a second zone 102 downstream of the first zone 104 and having a perovskite and $NO_x$ trap material coated thereon so that gas flowing through the monolith first flows over and/or through the hydrocarbon reduction and $NO_x$ reduction catalyst, and thereafter flows through the perovskite and $NO_x$ trap material for $NO_x$ oxidation and storage.

Figure 6:
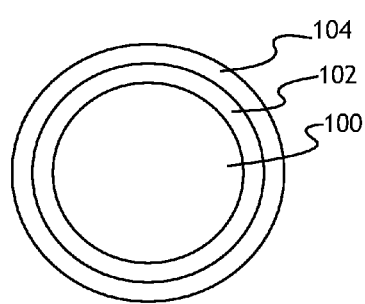
FIG. 6 illustrates a fluidized bed material for use in treatment of an exhaust stream including a bead or pellet having a perovskite and $NO_x$ trap material coated thereon and an overlying hydrocarbon reduction and $NO_x$ reduction catalyst on the perovskite and $NO_x$ trap material according to one embodiment of the invention.

FIG. 6 illustrates a fluidized bed material for treatment of an exhaust stream including a bead or pellet portion 100 which may be solid or porous and includes a first layer 102 coated on or over the bead or pellet 100 and a second layer 104 coated on or over the first layer 102.

Figure 7:
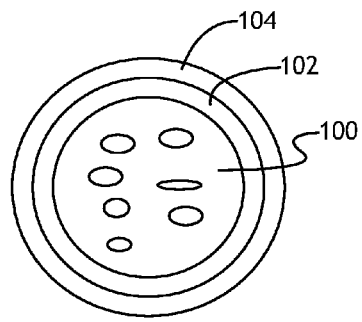
FIG. 7 is a catalyst support bead material similar to that of FIG. 6 wherein the support bead is porous.

In an alternative embodiment, as shown in FIG. 7, the bead or pellet 100 may be porous.

Figure 8:
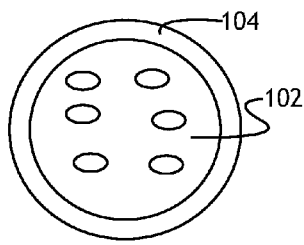
FIG. 8 is a fluidized bed material including a porous bead portion comprising a perovskite and $NO_x$ trap material having a hydrocarbon reduction and $NO_x$ reduction coating thereon according to one embodiment of the invention.

In yet another embodiment, as shown in FIG. 8, the pellet or bead portion may be made from the perovskite and $NO_x$ trap material 102 and may be porous, and having the hydrocarbon reduction and $NO_x$ reduction catalyst coated thereon or over the same.

Figure 9:
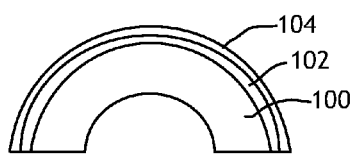
FIG. 9 is a fluidized bed packing material for use in treatment of an exhaust stream including a saddle-shaped substrate having a first layer including a perovskite and $NO_x$ trap material on the substrate and a hydrocarbon reduction and $NO_x$ reduction catalyst over the first layer according to one embodiment of the invention.

FIG. 9 illustrates another embodiment of a fluidized bed material including a saddle-shaped support substrate 100 having a first layer 102 including a perovskite and $NO_x$ trap material coated directly thereon or over the substrate 100 and a second layer or zone 104 including a hydrocarbon reduction and $NO_x$ reduction catalyst coated on the first layer or over the first layer 102.

Figure 10:
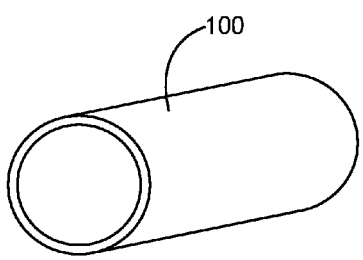
FIG. 10 illustrates another embodiment of a fluidized bed packing material including a ring structure which may have a first layer thereon including a perovskite catalyst and $NO_x$ trap material and a second layer overlying the first layer including a hydrocarbon reduction and $NO_x$ reduction catalyst according to one embodiment of the invention.

FIG. 10 illustrates an alternative fluidized bed support material such as a ring structure which may serve as the support substrate 100 for the perovskite and $NO_x$ trap material coating and the hydrocarbon reduction and $NO_x$ reduction catalyst coating.

Figure 17:
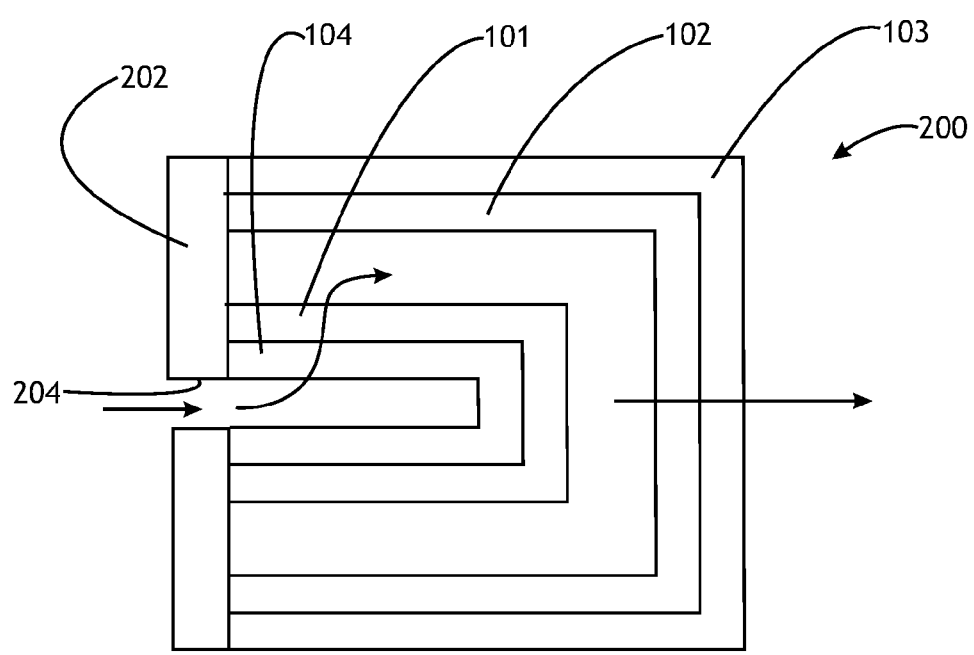
FIG. 17 illustrates a wall flow filter having a first surface including a hydrocarbon reduction and $NO_x$ reduction catalyst on or over the first surface, and a second surface having a perovskite catalyst and a $NO_x$ trap material on or over the second surface according to one embodiment of the invention.

FIG. 17 illustrates a wall flow filter 200 including front plate 202 defining an opening 204 for exhaust gas to flow into and through a first layer or zone including a hydrocarbon reduction and $NO_x$ reduction catalyst carried by a porous wall portion 101 and so that the exhaust gas thereafter flows over a second zone 102 carried by an outer wall portion 103 and wherein the second zone 102 includes a perovskite and $NO_x$ trap material for $NO_x$ oxidation and storage.

In one embodiment, the second zone 102 may include a combination of a perovskite catalyst and a second catalyst as described in further detail in the paragraphs that follow.

One embodiment of the invention may include a catalyst combination of a perovskite catalyst and a second catalyst that is not a perovskite catalyst. In one embodiment, the perovskite catalyst may have the general formula $ABO_3$, $AA'BO_3$ $ABB'O_3$, $AA'BB'O_3$, or $AA'BB'O_3$. In another embodiment, the second non-perovskite catalyst may comprise at least one metal from the precious metal or noble metal group of the periodic table. In another embodiment, the second non-perovskite catalyst may comprise at least one of palladium, platinum, rhodium or ruthenium, or catalyst systems including the same. In one embodiment, a catalyst combination may include a perovskite catalyst and a second catalyst non-perovskite catalyst, the second non-perovskite catalyst have a precious metal loading of about 1-160 g/ft$^3$, 1-80 g/ft$^3$, 10-60 g/ft$^3$, 1-40 g/ft$^3$, 1-20 g/ft$^3$, or a loading within such ranges. In one embodiment of a catalyst combination comprising a second non-perovskite catalyst, the perovskite catalyst may have a loading ranging from 1 to 120 g/L, 1 to 80 g/L, 1 to 40 g/L, 1 to 20 g/L.

In one embodiment, a catalyst combination may include a perovskite catalyst and a second non-perovskite catalyst, wherein the second non-perovskite catalyst comprises platinum having a loading of about 1-160 g/ft$^3$, 1-80 g/ft$^3$, 1-20 g/ft$^3$, or a loading within such ranges. In one embodiment of a catalyst combination comprising platinum, the perovskite catalyst may have a loading ranging from 1 to 120 g/L, 1 to 80 g/L, 1 to 40 g/L, 1 to 20 g/L.

In one embodiment, a catalyst combination may include a perovskite catalyst and a second non-perovskite catalyst, wherein the second non-perovskite catalyst comprises palladium having a loading of about 5-100 g/ft$^3$, or 10-60 g/ft$^3$, or a loading within such ranges. In one embodiment of a catalyst combination comprising palladium, the perovskite catalyst may have a loading ranging from 1 to 120 g/L, 1 to 80 g/L, 1 to 40 g/L, 1 to 20 g/L.

One embodiment may include treatment of a gas stream that includes $NO_x$ with a perovskite catalyst having the general formula $ABO_3$, $AA'BO_3ABB'O_3$, or $AA'BB'O_3$, in a catalytic oxidation reaction to oxidize nitric oxide in the gas stream.

In one embodiment, the perovskite catalyst of the general formula $ABO_3$ used in the oxidation reaction may be supported on any of a variety of substrates including, but not limed to, at least one of reactor packing structures and materials, beads, pellets, fluidized bed powders or other solid particulate material suspendable in a flow of gas, a flow-through monolith, a wall-flow monolith, a metal monolith, a ceramic monolith, metal or ceramic fabricated supports.

In one embodiment, the perovskite catalyst of the general formula $ABO_3$ used in the oxidation reaction may be not be supported by a substrate but may be formed into substrates having any of a variety of configurations including, but not limited to, flat panels, beads, pellets, or reactor packing material shapes.

In select embodiments, the addition of a second non-perovskite catalyst in a catalyst combination also including a perovskite catalyst improves the perovskite catalyst function. A catalyst combination comprising a perovskite catalyst and a non-perovskite catalyst may allow for oxidation of CO or unburned hydrocarbons in a gas stream. The addition of a second catalyst such as, but not limited to, platinum or palladium may improve NO oxidation and reduce low temperature fouling of the catalyst system. The use of a catalyst combination comprising a perovskite catalyst and a non-perovskite catalyst may improve NO oxidation with less precious metal catalyst being used compared to systems including only precious metal catalysts. In one embodiment, the catalyst combination may be coupled or coated on any of a variety of substrate or the catalyst combination may be formed into substrates. The catalyst combination comprising a perovskite catalyst and a non-perovskite catalyst may be used to treat any gas stream.

Referring now to FIG. 11, one embodiment is illustrated by a flow diagram of an exhaust system 10 for a lean burning hydrocarbon fueled power source 10. An exhaust stream 12 from the exhaust manifold of an engine operating at an air-to-fuel mass ratio well above the stoichiometric ratio is to be treated to reduce the $NO_x$ (mainly a mixture of NO and $NO_2$ with some $N_2O$) content to nitrogen ($N_2$). When the exhaust stream 12 is from a gasoline-fueled engine operated, for example, at an air to fuel ratio of greater than 17 (i.e. A/F>17), the exhaust gas contains some unburned hydrocarbons (HC), $NO_x$, carbon monoxide (CO), carbon dioxide ($CO_2$), water ($H_2O$), oxygen ($O_2$), and nitrogen ($N_2$). The fuel used may include, but is not limited to, gasoline and diesel fuel. The exhaust stream 12 from a diesel engine contains the same gaseous constituents plus suspended diesel particulates (composed of high molecular weight hydrocarbons deposited on carbon particles).

Such hydrocarbon containing exhaust streams 12 may be passed through a catalytic oxidation reactor 14, which substantially completes the oxidation of carbon monoxide to carbon dioxide and the oxidation of hydrocarbons to carbon dioxide and water. There is typically abundant oxygen in the exhaust gas stream 12 for these reactions.

The catalytic oxidation reactor 14, as shown best in FIG. 12, may include a traditional ceramic substrate material 50 such as cordierite coated with a washcoat 54, here shown as coating the rear side portion 18, that includes a perovskite catalyst of the general formula $ABO_3$, wherein A represents a rare earth metal from the Lanthanide Series and/or an alkaline-earth metal (La, Sr, Ce, Ba, Pr, Nd, or Gd) and wherein B represents a transition metal (Co, Ni, Cu, Zn, Cr, V, Pt, Pd, Rh, Ru, Ag, Au, Fe, Mn, or Ti).

But as stated above, the perovskite catalyst may be provided on a variety of substrates including, but not limed to, at least one of reactor packing structures and materials, beads, pellets, fluidized bed powders or other solid particulate material suspendable in a flow of gas, a flow-through monolith, a wall-flow monolith, a metal monolith, a ceramic monolith, metal or ceramic fabricated supports.

In one embodiment, the perovskite catalyst of the general formula $ABO_3$ used in the oxidation reaction may be formed into substrates of any of a variety of configurations including, but not limited to, flat panels, beads, pellets, flow-through or wall-flow monoliths, or reactor packing material shapes. Packing material shape may include, but are not limited to, rings, saddles, hollow cylinders or Raschig rings.

The perovskite catalyst primarily functions to oxidize nitric oxide (NO) to nitrogen dioxide ($NO_2$). Two exemplary perovskite catalysts of the general formula $ABO_3$ that may be utilized in the catalytic oxidation reactor 14 include $LaCoO_3$ and $LaMnO_3$.

In another exemplary embodiment, the catalytic performance of the perovskite catalyst of the general formula $ABO_3$ as described above may be enhanced by the substitution of a small amount of a promoter material for a portion of element A or element B in the catalytic formulation. Solid solutions of $ABO_3$ with $AA'BO_3$, or even $AA'BB'O_3$, may be utilized, wherein A' signifies a substitution of the promoter material for a portion of the A element, and wherein B' represents a substitution of the promoter material for a portion of the B element.

One illustrative promoter material is Strontium (Sr), and an exemplary formulation is $ASrBO_3$, wherein A and B are described as above. Two exemplary perovskite catalysts including the Strontium promoter material that may be utilized in the catalytic oxidation reactor 14 include $La_{1-x}Sr_xCoO_3$ and $La_{1-x}Sr_xMnO_3$.

Referring back to FIG. 12, a portion of the substrate material 50, here the front side portion 16, may be coated with a second washcoat 52 with platinum group metal (PGM) loading at about 5-150 g/ft$^3$ and may include platinum, palladium, a mixture of platinum and palladium, and other support materials. The second washcoat 52 may aid in oxidizing carbon monoxide to carbon dioxide and oxidizing hydrocarbons to carbon dioxide and water.

While the catalytic oxidation reactor 14 as shown in FIG. 12 includes a front side portion 16 including the second washcoat 52 and the rear side portion 18 including the first washcoat 54, other exemplary embodiments are specifically contemplated with other arrangements. For example, the entire substrate material 50 may be coated with both the first washcoat 54 and second washcoat 52, applied in consecutive steps or together in a single washcoat formulation. Alternatively, the entire substrate material 50 may be coated exclusively with the second washcoat 52 including the perovskite catalyst, depending upon the composition of the exhaust gas 12 and the desired treatment of the exhaust gas, and still fall within the spirit of the present invention.

Referring back to FIG. 11, ammonia ($NH_3$) or urea may also be added to exhaust stream 12 after the exhaust stream 12 exits the catalytic oxidation reactor 14. Ammonia can be stored in a suitable form (such as liquid ammonia or as urea) on-board a lean burn engine vehicle, or near-by a stationary engine, collectively referred to herein as an ammonia injector device 20, and may be added as a stream 22 to the exhaust stream 12 upstream of the catalytic reduction reactor 40 and the hydrocarbon particulate filter 45. The ammonia or urea from the stream 22 may participate in the reduction of nitric oxide (NO) and nitrogen dioxide ($NO_2$) to nitrogen ($N_2$).

The exhaust stream 12 treated with ammonia or urea then enters the catalytic reduction reactor 40. The catalytic reduction reactor 40 may include a selective catalytic reduction (SCR) catalyst 42 that functions primarily to substantially reduce NO and $NO_2$ (i.e. $NO_x$) to $N_2$ and water.

The SCR catalyst 42 may be formed from a washcoat (not shown) including a base metal as the active material contained in a zeolite material and other support materials (examples: Cu/ZSM-5, vanadia/titania etc.) coupled to a conventional substrate material such as cordierite. The base metal may aid in converting NO to $NO_2$ and subsequently converting $NO_2$ to $N_2$ and water which may be discharged through the tailpipe (not shown) as an emission.

Maximum reduction performance of the SCR catalyst 42 is often achieved at a substantially equimolar ratio (1:1 ratio) of NO and $NO_2$ in the exhaust stream 12, especially at lower temperatures (such as start up or warm up conditions) where the SCR catalyst 42 may not convert $NO_x$ to $N_2$ and water at its maximum efficiency. In addition, at the 1:1 ratio, the detrimental effects of high space velocity and SCR catalyst 42 aging may be minimized. As the engine-out $NO_x$ typically contains less than 10% $NO_2$, the oxidation catalyst 14 converts a portion of the engine-out NO to $NO_2$ to achieve a $NO/NO_2$ molar ratio closer to 1:1. When the temperature of the SCR catalyst 42, as measured by a temperature sensor 27, is sufficiently high (i.e. the temperature in which the SCR catalyst 42 may be operating at substantially peak efficiency to convert $NO_x$ regardless of exhaust gas 12 composition), the benefit of the equimolar $NO/NO_2$ ratio is diminished.

In order to achieve high $NH_3$ SCR efficiencies, the ratio of $NH_3$ to $NO_x$ must also be carefully maintained at close to 1:1. The ammonia or urea added from the injector device 20 to the exhaust stream 12 prior to entering the catalytic reduction reactor 40 therefore may be controlled to achieve this equimolar ratio. This control can be done by measuring the concentration of NOx in the exhaust stream using a $NO_x$ sensor 25 and controlling the amount of ammonia or urea injected from the injector device 20 as a function of the $NO_x$ measurement to achieve the desired 1:1 ratio.

Finally, the exhaust stream 12 flows through a particulate filter 45 to remove any remaining particulate matter and exits through a tailpipe (not shown) or similar type device to the atmosphere. In alternative exemplary arrangements, the particulate filter 45 may filter the exhaust stream 12 prior to entering the catalytic reduction reactor 40. The particulate filter 45 may be formed from various materials, including cordierite or silicone-carbide, which traps particulate matter.

Referring now to FIG. 13, a table is provided that compares the performance of various perovskite catalysts in accordance with the exemplary embodiments, in terms of the percentage of nitric oxide oxidation at 325 degrees Celsius, of the general formula $LaBO_3$ (B=Co or Mn) coupled to a conventional cordierite substrate material at various loadings (S.A. "Surface Area" refers to the specific surface area per unit mass of the catalytic materials), with and without a Strontium promoter, with commercially available platinum catalysts. The perovskite catalysts were prepared by the method described below in the Examples Section.

As shown in FIG. 13, the perovskite catalysts of the general formula $LaBO_3$ offered significant improvement of the oxidation of nitric oxide at 325 degrees Celsius as compared with the conventional platinum catalyst provided. Moreover, the addition of the Strontium promoter in increasing levels relative to Lanthanum, as exemplified by the general formula $La_{1-x}Sr_xBO_3$, appears to result in incremental improvements in nitric oxide oxidation as well.

Figure 14:
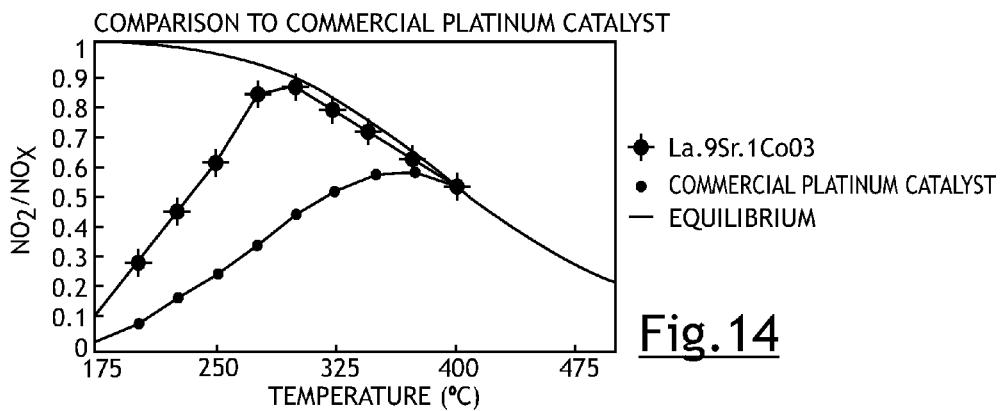
FIG. 14 is a graphical illustration of the nitric oxide oxidation performance of $LaCoO_3$ versus a commercial platinum NO oxidation catalyst over a wide range of temperatures.

FIG. 14 compares the performance of one exemplary perovskite catalyst including the Strontium promoter, $La_{0.9}Sr_{0.1}CoO_3$, versus a commercial platinum based catalyst, over a wide range of temperatures. The nitric oxide oxidation was confirmed by measuring the relative content of nitrogen dioxide in the $NO_x$ component of the exhaust stream at various temperatures. Here, the exhaust stream does not include water, carbon dioxide or hydrocarbons. The results confirm that $La_{0.9}Sr_{0.1}CoO_3$ appears to oxidize a greater portion of nitric oxide over a wide temperature range than a traditional platinum based catalyst.

Figure 15:
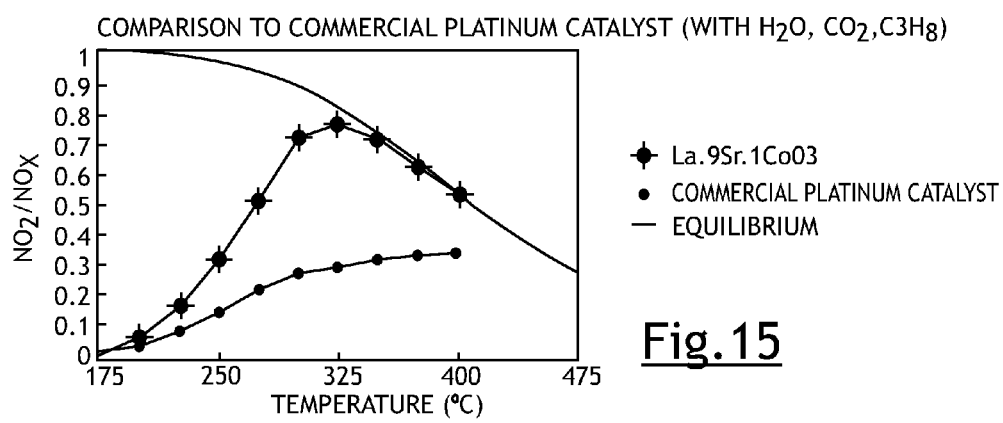
FIG. 15 is a graphical illustration of the nitric oxide oxidation performance of $La_{0.9}Sr_{0.1}CoO_3$ versus a commercial platinum catalyst over a wide range of temperatures.

FIG. 15 compares the performance of one exemplary perovskite catalyst including the Strontium promoter, $La_{0.9}Sr_{0.1}CoO_3$, versus a traditional platinum based catalyst, in terms of nitric oxide oxidation, over a wide range of temperatures in a typical lean exhaust stream containing water, carbon dioxide and hydrocarbons. The nitric oxide oxidation was confirmed by measuring the relative content of nitrogen dioxide in the $NO_x$ component of the exhaust stream at various temperatures. The results confirm that $La_{0.9}Sr_{0.1}CoO_3$ appears to oxidize a greater portion of nitric oxide in an exhaust stream including water, carbon dioxide and hydrocarbons over a wide temperature range.

Figure 16:
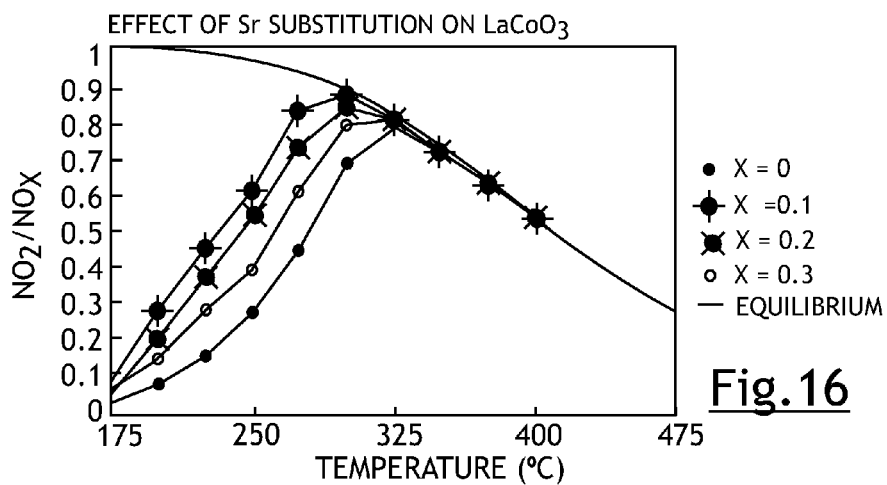
FIG. 16 is a graphical illustration of the nitric oxide oxidation performance of $La_{1-x}Sr_xCoO_3$ at various Sr loadings versus a commercial platinum catalyst over a wide range of temperatures.

FIG. 16 compares the performance of one exemplary perovskite catalyst, $La_{1-x}Sr_xCoO_3$ (x=0, 0.1, 0.2, 0.3), including the Strontium promoter, in terms of nitric oxide oxidation, over a wide range of temperatures in a typical lean exhaust stream containing water, carbon dioxide and hydrocarbons. FIG. 15 confirms that the addition of Strontium of as little as 10 molar percent of the Lanthanum component may improve the nitric oxide oxidation at various promoter levels as compared with the $LaCoO_3$.

The above description of embodiments of the invention is merely exemplary in nature and, thus, variations thereof are not to be regarded as a departure from the spirit and scope of the invention.

Examples

Catalyst Preparation $La_{1-x}Sr_xCoO_3$ (x=0, 0.1, 0.2, 0.3) and $La_{1-x}Sr_xMnO_3$ (x=0, 0.1) catalysts were prepared by citrate methods as shown in Table 1 below. In the methods, appropriate amounts of $La(NO_3)_3 \cdot 6H_2O$, $Co(NO_3)_2 \cdot 6H_2O$, $Mn(NO_3)_2$ solution, and $Sr(NO_3)_2$ were dissolved in distilled water with citric acid monohydrate. Citric acid was added in about a 10 weight percent excess to ensure complete complexation of the metal ions. The amount of water used was about 46.2 mL/g $La(NO_3)_3 \cdot 6H_2O$. The solution was set on a stirring and heating plate and stirred for 1 hour, then heated to about 80 degrees Celsius under continued stirring.

TABLE 1

|  | $LaCoO_3$ | $La_{0.9}Sr_{0.1}CoO_3$ | $LaMnO_3$ |
| --- | --- | --- | --- |
| $La(NO_3)_3 \cdot 6H_2O$ | 17.61 g | 35.62 g | 27.60 g |
| $Sr(NO_3)_2$ | — | 1.93 g | — |
| $Co(NO_3)_2 \cdot 6H_2O$ | 11.84 g | 26.60 g | — |
| $Mn(NO_3)_2$ | — | — | 14.14 g |
| $C_6H_8O_7 \cdot H_2O$ | 15.67 g | 34.51 g | 24.56 g |
| Deionized $H_2O$ | 825 ml | 1820 ml | 1275 ml |

During the preparation, water was evaporated until the solution became a viscous gel and just began evolving $NO_2$ gas. The gel was then placed overnight in an oven set at about 90 degrees Celsius. The resulting spongy material was crushed and calcined at about 700 degrees Celsius for about 5 hours in static air. The temperature was ramped at a rate of about 10 degrees Celsius per minute. When the temperature reached just below about 300 degrees Celsius, the citrate ions combusted vigorously, causing a larger spike in temperature and powder displacement. For this reason the powder was covered with several layers of $ZrO_2$ balls (the same as used for ball milling) to prevent powder displacement, but still allow gas mobility. After calcination, the powder was ball milled with about 6.33 mL water/g powder for about 24 hours. Afterward, the slurry was stirred continuously, and about 0.33 mL of 0.1 M $HNO_3$/g powder and about 5 mL water/g powder was added to the slurry. The resulting washcoat solution had a concentration of about 0.114 gram catalyst/mL solution.

A cordierite substrate was dipped in the washcoat solution and excess liquid removed, and the wet substrate was set horizontally in an oven set to about 200 degrees Celsius for about 30 minutes. This procedure was repeated until the desired loading was obtained. Finally, the catalyst was calcined at about 700 degrees Celsius for about 5 hours with an air flow of about 100 sccm.

What is claimed is:

1. A method comprising:
   treating an exhaust steam including $NO_x$ comprising:
   flowing the exhaust stream first over a hydrocarbon reduction and $NO_x$ reduction catalyst;
   and thereafter flowing the exhaust stream over a perovskite catalyst and a $NO_x$ trap material for $NO_x$ oxidation and storage.

2. A method as set forth in claim 1 wherein the perovskite catalyst and $NO_x$ trap material comprises a layer on or over a support substrate, and wherein the hydrocarbon reduction and $NO_x$ reduction catalyst comprises a layer on or over the layer including the perovskite catalyst then $NO_x$ trap material.

3. A method as set forth in claim 1 wherein the hydrocarbon reduction and $NO_x$ reduction catalyst comprises a first layer or zone on or over a first portion of a substrate and wherein the perovskite catalyst and a $NO_x$ trap material comprise a layer or zone on or over a second portion of the substrate and wherein the hydrocarbon reduction and $NO_x$ reduction catalyst is not on the perovskite catalyst and $NO_x$ trap material.

4. A method as set forth in claim 1 wherein the hydrocarbon reduction and $NO_x$ reduction catalyst and the perovskite catalyst and $NO_x$ trap material are supported by a substrate.

5. A method as set forth in claim 4 wherein the substrate is substantially flat.

6. A method as set forth in claim 4 wherein the substrate comprises a bead or pellet.

7. A method as set forth in claim 4 wherein the substrate is constructed and arranged to have a ring, saddle, hollow cylinder or Raschig ring shape.

8. A method as set forth in claim 4 wherein the substrate is porous.

9. A method as set forth in claim 4 wherein the substrate is solid.

10. A method as set forth in claim 4 wherein the substrate comprises a gas flow through monolith having a plurality of through-holes formed therein.

11. A method as set forth in claim 10 wherein the monolith comprises a ceramic or metal material.

12. A method as set forth in claim 4 wherein the substrate comprises a wall flow filter.

13. A method as set forth in claim 1 wherein the perovskite catalyst and $NO_x$ trap material are constructed and arranged as a support substrate not carried by another substrate and wherein the hydrocarbon reduction and $NO_x$ reduction catalyst is coated on or over the substrate.

14. A method as set forth in claim 13 wherein the perovskite catalyst and $NO_x$ reduction material is porous.

15. A method as set forth in claim 1 wherein the perovskite catalyst has the general formula $ABO_3$, $AA'BO_3$, $ABB'O_3$, or $AA'BB'O_3$, wherein A comprises a rare earth metal from the Lanthanide Series and/or an alkaline-earth metal and wherein B comprises a transition metal.

16. A method as set forth in claim 15, wherein said perovskite catalyst has the general formula $AA'BO_3$;
    wherein A comprises a rare earth metal from the Lanthanide Series and/or an alkaline-earth metal;
    wherein B comprises a transition metal; and
    wherein A' comprises a substitution of a promoter material for a portion of A.

17. A method as set forth in claim 15, wherein said perovskite catalyst has the general formula $ABB'O_3$,
    wherein A comprises a rare earth metal from the Lanthanide Series and/or an alkaline-earth metal;
    wherein B comprises a transition metal; and
    wherein B' comprises a substitution of a promoter material for a portion of B.

18. A method as set forth in claim 15, wherein said perovskite catalyst has the general formula $AA'BB'O_3$,
    wherein A comprises a rare earth metal from the Lanthanide Series and/or an alkaline-earth metal;
    wherein B comprises a transition metal;
    wherein A' comprises a substitution of a promoter material for a portion of A; and
    wherein B' comprises a substitution of a promoter material for a portion of B.

19. A method as set forth in of claim 18, wherein A' comprises Strontium.

20. A method as set forth in claim 15, wherein A is Lanthanum.

21. A method as set forth in claim 15, wherein B is Cobalt or Manganese or Iron.

22. A system for reducing $NO_x$ in a gas stream comprising:
    a catalytic oxidation reactor comprising a first reaction zone comprising a hydrocarbon reduction and $NO_x$ reduction catalyst; and a second zone downstream of the first zone, the second zone comprising a perovskite catalyst and a $NO_x$ trap material for $NO_x$ oxidation and storage.

23. A system as set forth in claim 22 wherein the perovskite catalyst has the general formula $ABO_3$, $AA'BO_3$ $ABB'O_3$, or $AA'BB'O_3$, wherein A comprises a rare earth metal from the Lanthanide Series and/or an alkaline-earth metal and wherein B comprises a transition metal.

24. The system of claim 22, wherein said perovskite catalyst is of the general formula $AA'BO_3$;
    wherein A comprises a rare earth metal from the Lanthanide Series and/or an alkaline-earth metal;
    wherein B comprises a transition metal; and
    wherein A' comprises a substitution of a promoter material for a portion of A.

25. A system as set forth in claim 22, wherein said perovskite catalyst is of the general formula $ABB'O_3$;
    wherein A comprises a rare earth metal from the Lanthanide Series and/or an alkaline-earth metal;
    wherein B comprises a transition metal; and
    wherein B' comprises a substitution of a promoter material for a portion of B.

26. A system as set forth in claim 22, wherein said perovskite catalyst is of the general formula $AA'BB'O_3$;
    wherein A comprises a rare earth metal from the Lanthanide Series and/or an alkaline-earth metal;
    wherein B comprises a transition metal;
    wherein A' comprises a substitution of a promoter material for a portion of A; and
    wherein B' comprises a substitution of a promoter material for a portion of B.

* * * * *